United States Patent
Laskowsky et al.

(10) Patent No.: US 12,454,194 B2
(45) Date of Patent: Oct. 28, 2025

(54) ELECTRIC VEHICLE ENERGY STORAGE SYSTEM TIME DISCHARGE ESTIMATION AND MANAGEMENT

(71) Applicant: GM GLOBAL TECHNOLOGY OPERATIONS LLC, Detroit, MI (US)

(72) Inventors: Patricia M. Laskowsky, Ann Arbor, MI (US); Aniket P. Kothari, Rochester Hills, MI (US); Ethan R. Harrison, Burton, MI (US); Sabrina Elaine Ridenour, Novi, MI (US); Timothy Bresson, Ann Arbor, MI (US)

(73) Assignee: GM GLOBAL TECHNOLOGY OPEREATIONS LLC, Detroit, MI (US)

( * ) Notice: Subject to any disclaimer, the term of this patent is extended or adjusted under 35 U.S.C. 154(b) by 218 days.

(21) Appl. No.: 18/454,355

(22) Filed: Aug. 23, 2023

(65) Prior Publication Data
US 2025/0065771 A1   Feb. 27, 2025

(51) Int. Cl.
*B60L 55/00*    (2019.01)
*H02J 3/00*     (2006.01)
*H02J 7/00*     (2006.01)

(52) U.S. Cl.
CPC .............. *B60L 55/00* (2019.02); *H02J 3/003* (2020.01); *H02J 7/0063* (2013.01)

(58) Field of Classification Search
CPC ......... B60L 55/00; H02J 3/003; H02J 7/0063; H02J 7/0047; G06F 18/213; G06Q 50/06
See application file for complete search history.

(56) References Cited

U.S. PATENT DOCUMENTS

| | | | |
|---|---|---|---|
| 2013/0176000 A1 | 7/2013 | Bishop et al. | |
| 2015/0054466 A1* | 2/2015 | Kinomura | B60L 53/68 320/134 |
| 2022/0097552 A1 | 3/2022 | Dow | |
| 2024/0333027 A1* | 10/2024 | Anegawa | H02J 13/00034 |

FOREIGN PATENT DOCUMENTS

| | | |
|---|---|---|
| DE | 102013201529 A1 | 7/2014 |
| JP | 6456153 B2 | 1/2019 |

* cited by examiner

*Primary Examiner* — Michael C Zarroli
(74) *Attorney, Agent, or Firm* — Ingrassia Fisher & Lorenz, LLP | IF&L

(57) ABSTRACT

A method includes obtaining sensor data for a vehicle having an energy storage system that is configured provide power for a home under certain conditions; obtaining home data as to a plurality of characteristics that pertain to power requirements for the home; and calculating, via a processor, a discharge time for the energy storage system based on the sensor data for the vehicle and the plurality of characteristics of the home.

20 Claims, 5 Drawing Sheets

ELECTRIC VEHICLE ENERGY STORAGE SYSTEM TIME DISCHARGE ESTIMATION AND MANAGEMENT

TECHNICAL FIELD

The technical field generally relates to electric vehicles and, more specifically, to methods and systems for estimating and management of discharge time for an energy storage system of the electric vehicle.

BACKGROUND

Certain electric vehicles today have the capability of providing power, such as to a house of the user, while an energy storage system of the vehicle is discharging. However, existing techniques may have difficulty in estimating and managing a discharge time for the energy storage system of the electric vehicle.

Accordingly, it is desirable to provide improved methods and systems for estimating and managing a discharge time for an energy storage system for an electric vehicle. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes obtaining sensor data for a vehicle having an energy storage system that is configured provide power for a home under certain conditions; obtaining home data as to a plurality of characteristics that pertain to power requirements for the home; and calculating, via a processor, a discharge time for the energy storage system based on the sensor data for the vehicle and the plurality of characteristics of the home.

Also in an exemplary embodiment, the sensor data for the vehicle includes a parasitic load for the vehicle as the vehicle is plugged into the home; and the discharge time is calculated also based on the parasitic load and the plurality of characteristics of the home.

Also in an exemplary embodiment, the plurality of characteristics includes a physical size of the home; and the discharge time is calculated using the physical size of the home.

Also in an exemplary embodiment, the plurality of characteristics includes a geographic location of the home; and the discharge time is calculated using the geographic location of the home.

Also in an exemplary embodiment, the plurality of characteristics includes a present time of year and a present time of day; and the discharge time is calculated using the present time of year and the present time of day.

Also in an exemplary embodiment, the plurality of characteristics includes a listing of appliances in the home; and the discharge time is calculated using the listing of appliances in the home.

Also in an exemplary embodiment, the method further includes obtaining user inputs from a user of the home as to one or more of the plurality of characteristics; and calculating, via the processor, an updated discharge time using the user inputs.

Also in an exemplary embodiment, the method further includes obtaining usage data as to actual usage of power of the home; and calculating, via the processor, an updated discharge time using the usage data.

Also in an exemplary embodiment, the method further includes calculating, via the processor, an updated discharge time over time using the plurality of characteristics as inputs in a machine learning algorithm.

Also in an exemplary embodiment, the method further includes obtaining a high power consumption curve associated with a first group of users with power that is greater than a predetermined threshold; obtaining a low power consumption curve associated with a second group of users with power consumption that is less than the predetermined threshold; and automatically controlling a plurality of appliances in the home by selectively switching one or more of the plurality of appliances into an energy efficient mode, based on one or more comparisons of actual power consumption of the home with the low power consumption curve, the high power consumption curve, or both, in accordance with instructions provided by the processor.

In another exemplary embodiment, a system is provided that includes one or more sensors and a processor. The one or more sensors are configured to obtain sensor data as to a vehicle having an energy storage system that is configured to provide power for a home under certain conditions. The processor is coupled to the one or more sensors, and is configured to at least facilitate obtaining home data as to a plurality of characteristics that pertain to power requirements for the home; and calculating a discharge time for the energy storage system based on the sensor data for the vehicle and the plurality of characteristics of the home.

Also in an exemplary embodiment, the sensor data for the vehicle includes a parasitic load for the vehicle as the vehicle is plugged into the home; and the processor is configured to at least facilitate calculating the discharge time also based on the parasitic load and the plurality of characteristics of the home.

Also in an exemplary embodiment, the plurality of characteristics includes a physical size of the home; and the processor is configured to at least facilitate calculating the discharge time using the physical size of the home.

Also in an exemplary embodiment, the plurality of characteristics includes a geographic location of the home; and the processor is configured to at least facilitate calculating the discharge time using the geographic location of the home.

Also in an exemplary embodiment, the plurality of characteristics includes a present time of year and a present time of day; and the processor is configured to at least facilitate calculating the discharge time using the present time of year and the present time of day.

Also in an exemplary embodiment, the processor is further configured to at least facilitate obtaining user inputs from a user of the home as to one or more of the plurality of characteristics; and calculating an updated discharge time using the user inputs.

Also in an exemplary embodiment, the processor is further configured to at least facilitate obtaining usage data as to actual usage of power of the home; and calculating an updated discharge time using the usage data.

Also in an exemplary embodiment, the processor is further configured to at least facilitate calculating an updated discharge time over time using the plurality of characteristics as inputs in a machine learning algorithm.

Also in an exemplary embodiment, the processor is further configured to at least facilitate obtaining a high power consumption curve associated with a first group of users with power that is greater than a predetermined threshold;

obtaining a low power consumption curve associated with a second group of users with power consumption that is less than the predetermined threshold; and automatically controlling a plurality of appliances in the home by selectively switching one or more of the plurality of appliances into an energy efficient mode, based on one or more comparisons of actual power consumption of the home with the low power consumption curve, the high power consumption curve, or both.

In another exemplary embodiment, a system is provided that includes one or more sensors and a processor. The one or more sensors are configured to obtain sensor data as to a high voltage storage device that is configured to provide power for a home under certain conditions. The processor is coupled to the one or more sensors, and is configured to at least facilitate obtaining home data as to a plurality of characteristics that pertain to power requirements for the home, the plurality of characteristics including a physical size of the home, a geographic location in which the home is located, a present time of year, a present time of day, and a listing of appliances in the home; and calculating a discharge time for the energy storage system based on the sensor data for the high voltage storage device and the plurality of characteristics of the home, including the physical size of the home, the geographic location, the present time of year, the present time of day, and the listing of appliances in the home.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
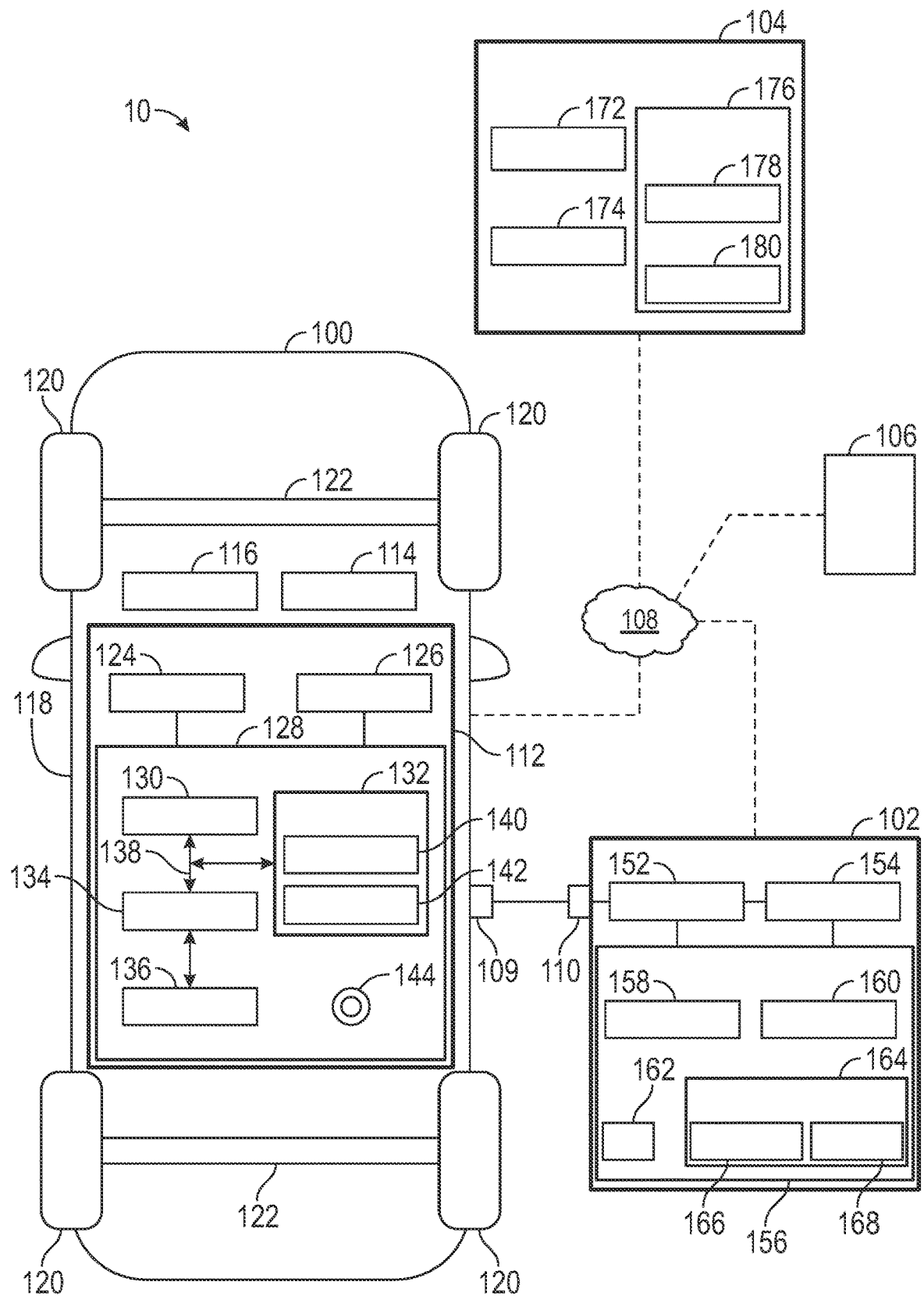
FIG. 1 is a functional block diagram of a system for estimating and managing a discharge time for an energy storage system of an electric vehicle, in accordance with exemplary embodiments.

FIG. 1 illustrates a system 10, in accordance with an exemplary embodiment. As depicted in FIG. 1, in various embodiments the system 10 includes a vehicle 100 and a home 102 that are configured to be coupled together via respective connection devices 109, 110 for flow of electrical power or current therebetween. Also as depicted in FIG. 1, in various embodiments, the system 10 may also include one or more remote servers 104 and/or other third party sites 106 that are coupled to one another, and/or to the vehicle 100 and/or the home 102, via one or more wireless communications networks 108.

As depicted in FIG. 1, in various embodiments, the vehicle 100 includes a rechargeable energy storage system (RESS) 114 (e.g., a high voltage vehicle battery). Also as depicted in FIG. 1, when the vehicle 100 is connected to the home 102 via the respective connection devices 109, 110, electrical power or current may flow between the home 102 and the vehicle 100 in different directions depending on circumstances. For example, in typical situations in which the home 102 has enough power and the RESS 114 requires charging, a power system 152 of the home 102 is utilized to charge the RESS 114. Conversely, in certain other situations in which the RESS 114 has power that is needed by the home 102 (e.g., in the case of a blackout and/or power shortage for the home 102), the RESS 114 discharges electrical power, and the electrical power is provided to the power system 152 of the home 102 for use within the home 102.

In various embodiments, when power is to be supplied from the RESS 114 of the vehicle 100 to the home 102, the discharge time for the RESS 114 (e.g., the time at which the current level decreases below a predetermined threshold) is estimated and managed by the system 10, in accordance with the steps of the process 200 and steps thereof as depicted in FIGS. 2-6 and described further below in connection therewith. Also as described in greater detail further below, in various embodiments, the estimation and management of the discharge time is performed by one or more of the vehicle 100, the home 102, and/or the remote server 104, utilizing information obtained therefrom and/or from the third party site 106 (e.g., form a utility company that provides power service for the home 102).

In various embodiments, the vehicle 100 comprises an electric vehicle. In certain embodiments, the vehicle 100 also comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform). In certain embodiments, the vehicle 100 could also comprise a high energy storage device (either mobile or stationary) that includes an energy storage system (ESS). For example, in certain embodiments, the vehicle 100 may instead comprise or include a stationary storage battery, for example on a wall of the home 102, or the like.

In various embodiments, the vehicle includes a body 118 that substantially encloses other components of the vehicle 100. The vehicle 100 also includes a plurality of wheels 120. In one embodiment, the vehicle 100 includes four wheels 120, although this may vary in other embodiments (for example for trucks and certain other vehicles). A propulsion system 116 (e.g., a drive system) drives the wheels 120, for example via axles 122. In various embodiments, the propulsion system 116 is powered, in full or in part, via the RESS 114.

As alluded to above, in various embodiments the RESS 114 comprises a high voltage vehicle battery and/or other energy storage system that provides power for the vehicle 100. Also as alluded to above, in various embodiments, the RESS 114 is charged via a power system 152 of the home 102 when the vehicle 100 is plugged into the power system 152 of the home 102 via respective connection devices 109, 110 under certain circumstances (e.g., in which the RESS 114 requires charging and the power system 152 of the home 102 has enough electrical power to meet its current needs). In addition, also as alluded to above, in various embodiments, the RESS 114 discharges power, to thereby provide power to the home 102, when the vehicle 100 is plugged into the power system 152 of the home 102 via respective connection devices 109, 110 under certain other circumstances (e.g., in which the RESS 114 has power and the power system 152 of the home 102 does not have enough electrical power to meet its current needs, such as in an electrical blackout or other power shortage).

In the embodiment depicted in FIG. 1, a control system 112 is coupled to the RESS 114. In various embodiments, the control system 112 controls the charging and discharging of the RESS 114, including the estimation and management of the discharge time for the RESS 114 when it is supplying power to the home 102. Also in various embodiments, the control system 112 is also coupled to the propulsion system 116, among other components of the vehicle 100, and also controls operation and functionality thereof.

As depicted in FIG. 1, in various embodiments the control system 112 includes one or more sensors 124, a transceiver 126, and a controller 128.

In various embodiments, the one or more sensors 124 obtain sensor data to facilitate the estimation and management of the discharge time for the RESS 114. In certain embodiments, the one or more sensors 124 obtain sensor data as to an electrical power and/or other current associated with the RESS 114, among other potential sensor data. Also in certain embodiments, the sensors 124 may also comprise and/or be utilized in connection with one or more location systems, such as a global positioning system (GPS).

Also in various embodiments, the transceiver 126 provides for communication between the vehicle 100 and the home 102, the remote server 104, and/or the third party site 106 for facilitating estimation and management of the discharge time for the RESS 114, among various other possible communications. In various embodiments, the transceiver 126 facilitates communication between the vehicle 100 and these and/or other entities via the one or more wireless communications networks 108.

In various embodiments, the controller 128 is coupled to the one or more sensors 124 and receives sensor data therefrom. In various embodiments, the controller 128 is further coupled to the RESS 114, and controls estimation and management of the discharge time thereof, among other functionality of the vehicle 100. In various embodiments, the controller 128 is also coupled to the transceiver 126, and controls communications via the transceiver 126, including for the estimation and management of the discharge time, among other functionality of the vehicle 100. In various embodiments, the controller 128 provides this functionality in accordance with the process 200 depicted in FIGS. 2-6 and as described in greater detail further below in connection therewith.

In various embodiments, the controller 128 comprises a computer system (also referred to herein as computer system 128), and includes a processor 130, a memory 132, an interface 134, a storage device 136, and a computer bus 138.

In various embodiments, the controller 128 (and, in certain embodiments, the control system 112 itself) is disposed within the body 118 of the vehicle 100. In certain embodiments, the controller 128 and/or control system 112 and/or one or more components thereof may be disposed outside the body 118, for example on a remote server, in the cloud, or other device where image processing is performed remotely.

In the depicted embodiment, the computer system of the controller 128 includes a processor 130, a memory 132, an interface 134, a storage device 136, and a bus 138. The processor 130 performs the computation and control functions of the controller 128, and may comprise any type of processor or multiple processors, single integrated circuits such as a microprocessor, or any suitable number of integrated circuit devices and/or circuit boards working in cooperation to accomplish the functions of a processing unit. During operation, the processor 130 executes one or more programs 140 contained within the memory 132 and, as such, controls the general operation of the controller 128 and the computer system of the controller 128, generally in executing the processes described herein, such as the process 200 of FIGS. 2-6 and described further below in connection therewith.

The memory 132 can be any type of suitable memory, including various types of non-transitory computer readable storage medium. In certain examples, the memory 132 is located on and/or co-located on the same computer chip as the processor 130. In the depicted embodiment, the memory 132 stores the above-referenced program 140 along with stored values 142 (e.g., neural networks, machine learning models, look-up tables, thresholds, and/or other values with respect to estimation and management of the discharge time for the RESS 114).

The interface 134 allows communication to the computer system of the controller 128, for example from a system driver and/or another computer system, and can be implemented using any suitable method and apparatus. In one embodiment, the interface 134 obtains the various data from the one or more sensors 124, among other possible data sources. The interface 134 can include one or more network interfaces to communicate with other systems or components. The interface 134 may also include one or more network interfaces to communicate with technicians, and/or one or more storage interfaces to connect to storage apparatuses, such as the storage device 136. In addition, in certain embodiments, the interface 134 is also configured to communicate to a cloud, and for example to a back office (e.g., such as the remote server 104, third party site 106, and/or other information sources).

The storage device 136 can be any suitable type of storage apparatus, including various different types of direct access storage and/or other memory devices. In one exemplary embodiment, the storage device 136 comprises a program product from which memory 132 can receive a program 140 that executes one or more embodiments of one or more processes of the present disclosure, such as the steps of the process 200 of FIGS. 2-6 and the implementations of FIG. 4 and described further below in connection therewith. In another exemplary embodiment, the program product may be directly stored in and/or otherwise accessed by the memory 132 and/or a disk (e.g., disk 144), such as that referenced below.

The bus 138 serves to transmit programs, data, status and other information or signals between the various components of the computer system of the controller 128. The bus 138 can be any suitable physical or logical means of connecting computer systems and components. This includes, but is not limited to, direct hard-wired connections, fiber optics, infrared and wireless bus technologies. During operation, the program 140 is stored in the memory 132 and executed by the processor 130.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 130) to perform and execute the program.

Figure 2:
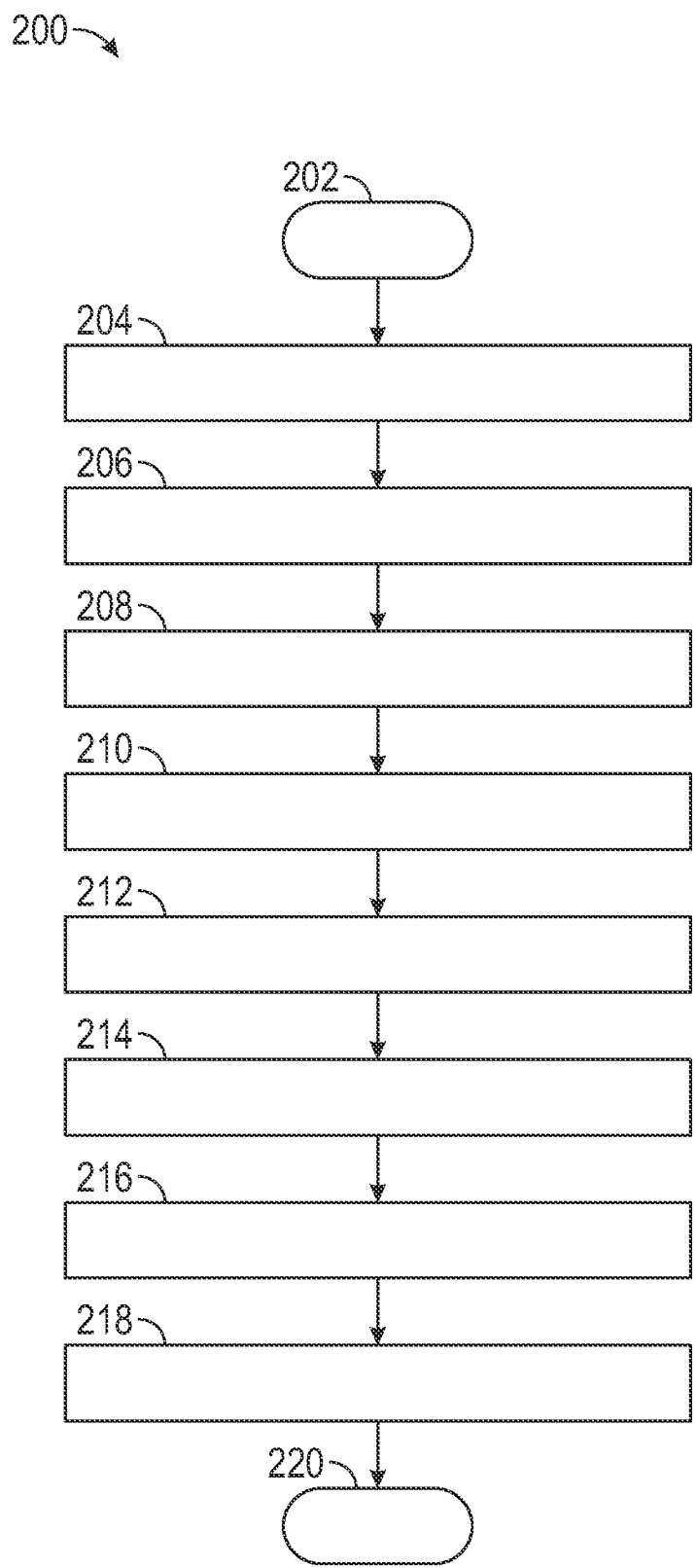
FIG. 2 is a flowchart of process for estimating and managing a discharge time for an energy storage system of an electric vehicle, and that can be implemented in connection with the system of FIG. 1, in accordance with an exemplary embodiments.

With continued reference to FIG. 1, in various embodiments the home 102 may comprise a house, home, office, and any one of a number of other buildings, structures, devices, and/or other systems (and that are collectively referred to as a "home" 102 herein for convenience). As depicted in FIG. 2, the home 102 includes, among various other possible components, the above-referenced connection device 110 for connecting to the vehicle 100, as well as the above-referenced power system 152, in addition to one or more appliances 154 and a control system 156.

In various embodiments, the power system 152 provides power to various appliances 154 of the home 102, in addition to providing power to and/or receiving power from the RESS 114 when the vehicle 100 is connected to the home 102 via the respective connection devices 109, 110 under various circumstances.

In various embodiments, the appliances 154 include any number of different potential electrical appliances that rely on electrical power, in whole or in part, for operation. For example, in various embodiments, the appliances 154 may include washing machines and dryers, dishwashers, refrigerators and freezers, air conditioning and heating systems, ovens, stoves, and/or other cooking apparatus, televisions, gaming systems, and/or other entertainment appliances, Internet connectivity and/or other communication devices, and/or any number of other different types of appliances and/or related systems and/or devices (collectively referred to as "appliances" herein for convenience).

In various embodiments, under normal circumstances (e.g., in which sufficient electrical power is available), the power system 152 provides electrical power for operation of the appliances 154. In addition, also in various embodiments, also under normal circumstances (e.g., in which sufficient electrical power is available), the power system 152 provides electrical power for charging the RESS 114 when the vehicle 100 is plugged into the home 102. Also in various embodiments, under certain other circumstances (e.g., in which sufficient electrical power is not available for the home 102, such as in an electrical blackout or other power shortage, and the vehicle 100 is connected to the home 102), the power system 152 receives power for powering the appliances during discharge of the RESS 114.

In various embodiments, the control system 156 is coupled to the power system 152 and to the appliances 154, and controls operation thereof. In addition, in certain embodiments, the control system 156 also controls (in whole or in part) the estimation and control of the discharge time for the RESS 114 of the vehicle 100, in accordance with the steps of the process 200 as depicted in FIGS. 2-6 and as described in greater detail further below in connection therewith. It will be appreciated that the vehicle 100 (among other components of the system 10) may estimate the time to discharge level, among other functions.

As depicted in FIG. 1, in various embodiments, the control system 156 comprises one or more sensors 158, a processor 160, a transceiver 162, and a memory 164.

In various embodiments, the one or more sensors 158 are similar to the sensors 124 of the vehicle 100 as described above, and provide sensor data (such as electrical power sensor data and/or electrical current sensor data) that is used for estimating and managing the discharge time for the RESS 114 (among other possible uses).

Also in various embodiments, the processor 160 is similar to the processor 130 as described above, and controls operation of the power system 152 and appliances 154 for the home 102, in addition to controlling estimating and managing the discharge time for the RESS 114 (among various other possible functionality) in various embodiments.

In addition, in various embodiments, the transceiver 162 is similar to the transceiver 126 as described above, and facilitates communications between the home 102 and the vehicle 100, the remote server 104, and/or the third party site 106, including for controlling estimating and managing the discharge time for the RESS 114 (among various other possible communications) in various embodiments.

Also in various embodiments, the memory 164, the program 166, and the stored values 168 are also similar to the memory 132, the program 140, and the stored values 142, respectively, of the vehicle 100 as described above, and facilitate the estimating and managing the discharge time for the RESS 114 (among various other possible functions) in various embodiments. It will be appreciated that the control system 156 of the home 102 may also include one or more other components similar to the controller 128 of the vehicle 100, among various other components.

In various embodiments, the remote server 104 may also control (in whole or in part) the estimation and management of the discharge time of the RESS 114, among various other possible functionality. As depicted in FIG. 1, in various embodiments, the remote server 104 includes a transceiver 172, a processor 174, and a memory 176 that includes one or more programs 178 and stored values 180, among various other possible components.

Also in various embodiments, the transceiver 172 is similar to the transceiver 126 as described above, and facilitates communications between the remote server 104 and the vehicle 100, the home 102, and/or the third party site 106, including for controlling estimating and managing the discharge time for the RESS 114 (among various other possible communications) in various embodiments.

In addition, in various embodiments, the processor 174 is similar to the processor 130 as described above, and controls operation of the remote server 104, in addition to controlling estimating and managing the discharge time for the RESS 114 (among various other possible functionality) in various embodiments.

Also in various embodiments, the memory 176, the program 178, and the stored values 180 are also similar to the memory 132, the program 140, and the stored values 142, respectively, of the vehicle 100 as described above, and facilitate the estimating and managing the discharge time for the RESS 114 (among various other possible functions) in various embodiments. It will be appreciated that the remote server 104 may also include one or more other components similar to the controller 128 of the vehicle 100, among various other components.

In various embodiments, the third party site 106 corresponds to a utility company that provides electrical power services for the home 102. Also in various embodiments, the third party site 106 provides information as to electrical usage for the home 102, and/or for one or more similar homes, to the home 102, the vehicle 100, and/or the remote server 104 (e.g., via the wireless communications networks 108 of FIG. 1 in various embodiments). Also in various embodiments, the information from the third party site 106

(and/or from other providers) may also be sent to the cloud and then transferred to the vehicle 100, the home 102, or the remote server 104.

FIG. 2 is a flowchart of process 200 for estimating and managing a discharge time for an RESS of a vehicle, including for providing back-up energy for a home or other structure or system, in accordance with an exemplary embodiment. In various embodiments, the process 200 can be implemented in connection with the system 10 of FIG. 1. Also in accordance with various embodiments, the process 200 is also described herein with respect to FIGS. 3-6, which depict exemplary implementations of various steps of the process 200.

As depicted in FIG. 2, the process 200 begins at step 202. In certain embodiments, the process 200 begins when the home 102 requires electrical power from the RESS 114 while the vehicle 100 is connected to the home 102. In one embodiment, the steps of the process 200 are performed continuously while the vehicle 100 is connected to the home 102 and/or while the home 102 requires electrical power from the RESS 114 while the vehicle 100 is connected to the home 102.

In various embodiments, vehicle data is obtained at step 204. In various embodiments, the vehicle data is obtained from one or more sensors 124 of the vehicle 100 for use in the estimation and management of the discharge time for the RESS 114 of FIG. 1. Also in various embodiments, the vehicle data includes, among other possible data, sensor data as to a state of electrical charge associated with the RESS 114.

Also in various embodiments, home data is obtained at step 206. In various embodiments, the home data is obtained, in whole or in part, from one or more sensors 158 of the home 102, and/or from the appliances 154 and/or control system 156 of the home 102, and/or from the remote server 104 and/or third party sites 106 for use in the estimation and management of the discharge time for the RESS 114 of FIG. 1. Also in various embodiments, the vehicle data includes, among other possible data, sensor data as to a current state of current or power associated with the power system 152, electrical power needs of the appliances 154, and/or other characteristics of the home 102 pertaining to power requirements of the home 102, based on the physical characteristics of the home 102, its location and contents, and/or current conditions pertaining to the home 102 (e.g., including a geographic region for the home 102, a current season of the year and time of day, a square footage of the home 102, an identification of the appliances 154, a target discharge level for the home 102, and so on). In various embodiments, the collection of sensor data via the sensors is at least facilitated by one or more of the processors of FIG. 1 (e.g., in providing an inquiry for such information and/or the collection thereof, and/or in providing instructions to one or more transceivers and/or sensors of FIG. 1, or the like).

In addition, in certain embodiments, user inputs may also be obtained at step 208. In certain embodiments, user inputs are obtained from manual input of a user of the vehicle 100 and/or the home 102 with respect to one or more pieces of information described above in connection with steps 204 and/or 206, and/or other information for estimation and management of the discharge time for the RESS 114 of FIG. 1. In various embodiments, the collection of user inputs is at least facilitated by one or more of the processors of FIG. 1 (e.g., in providing instructions for a display or message to the user to request user inputs, or the like).

In various embodiments, an initial time estimate is performed for the discharge time for the RESS 114 (step 210). In certain embodiments, the initial time estimate is performed when the vehicle 100 is first plugged into the home 102. However, this may vary in other embodiments. In various embodiments, the discharge times may be calculated when the RESS 114 is either in a plugged or unplugged state with respect to the home 102.

Figure 3:
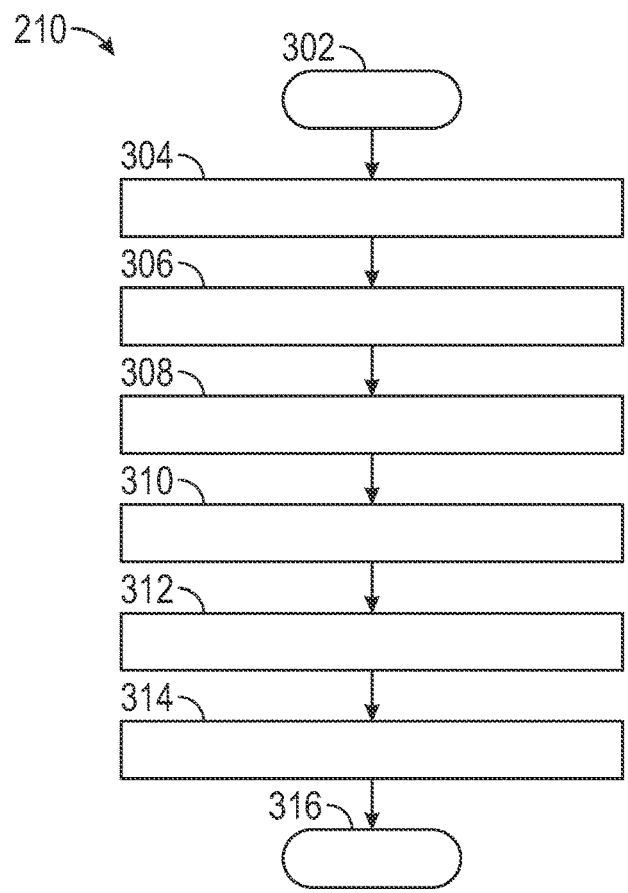
FIGS. 3-6 depict flow diagrams for various steps of the process of FIG. 2, in accordance with exemplary embodiments.

With reference to FIG. 3, a flowchart is provided for an exemplary implementation of step 210 of the process 200 of FIG. 2, in accordance with an exemplary embodiments. As depicted in FIG. 3, in various embodiments step 210 begins at step 302 (e.g., when an initial estimation of the discharge time for the RESS 114 is requested).

In various embodiments, a latching current is determined (step 304). Specifically, in various embodiments, the latching current comprises a total discharge load ($I_{total\_Dis\_load}$), and is determined as the sum of (A) current from an electrical vehicle supply equipment (EVSE) (e.g., corresponding to the power system 152 of FIG. 1) and (B) a current associated with a parasitic load of the vehicle 100. In various embodiments, the current from the EVSE and the parasitic load of the vehicle 100 are determined using sensor data from the sensors 158, 124 of FIG. 1. In certain embodiments, respective power values are first obtained via the sensors of FIG. 1, and are then converted to respective electric current values via one or more of the processors of FIG. 1.

Specifically, in certain embodiments the parasitic load pertains to an electrical load that is needed for operation of the vehicle 100 while it is plugged into the home 102 (e.g., for cabin conditioning, and so on). In certain embodiments, the parasitic load is measured as power and converted to current. In certain other embodiments, the parasitic load is measured via a current sensor, for example on a vehicle bus.

Also in certain embodiments, the current from the EVSE corresponds to an EVSE power achieved, and refers to a power capability of the station (e.g., of or associated with the power system 152 of FIG. 1). In certain embodiments, is determined based on the size of an inverter of the station. Also in certain embodiments, the power can be converted to current by accessing the voltage on the charger in the home 102.

In various embodiments, the measure of current resulting from the sum of the EVSE power achieved and the parasitic load of the vehicle 100 is referred to as the total discharge load ($I_{total\_Dis\_load}$), and represents the instantaneous total current leaving the high voltage RESS 114 to support a discharge operation.

Also in various embodiments, the power for the rest of the discharge cycle is latched (step 306). In certain embodiments, this is performed after a calibratable delay for the circuit to load. Specifically, in certain embodiments, there is a ramp-up to providing current from the EVSE (e.g., the power system 152) to the vehicle 100 (also referred to as the "electric vehicle" or "EV"). In addition, in various embodiments, there is a ramp-up of current on the parasitic loads. In certain embodiments, the control system 112 (e.g., the processor 130 of FIG. 1) will wait the calibratable amount of time, and then latch the current. In various embodiments, this initial current is used for the remainder of the discharge cycle $I_{total\_Dis\_load\_0}$. In addition, in certain embodiments, the initial latched current is updated for each discharge cycle based on a location (e.g., as determined via a global positioning system (GPS) of or associated with the sensors 124) and used to estimate unplugged discharge times. Also in certain embodiments, the initial latched current $I_{total\_Dis\_load\_0}$ updated will also be updated with a moving average during an active discharge time for the RESS 114.

In various embodiments, a power associated with the home 102 is determined (step 308). In various embodiments, various characteristics of the home 102 are obtained (e.g., as retrieved from computer memory) and utilized in determining the power associated with the home. In certain embodiments, the characteristics include the following (among other possible characteristics): a region of use (e.g., a geographic region) associated with the home 102, a current season of use (e.g., a current season of the year), a present time of use (e.g., a present time of day), a size of the home 102 (e.g., a square footage of the home 102), and a list of major appliances 154 that are utilized in the home 102.

In certain embodiments, the house characteristics may initially comprise a series of default house characteristics. In certain other embodiments, the house characteristics may be obtained via location data (e.g., from a GPS system), and/or via user inputs (e.g., via a mobile app on a smart phone or other electronic device of the user).

In certain embodiments, an amount of electrical power is estimated based on the house characteristics, for example utilizing various look-up tables and/or other data stored in computer memory that relates the house characteristics to expected power utilization in connection therewith.

For example, in certain embodiments, a power associated with the region of use may be represented as follows:

$P_{RoU}$=P(Region of Use(e.g., via GPS),Square Footage of House(e.g., in feet),Time of Year(e.g., Julian Date/Time)).

In addition, in certain embodiments, the power associated with the region of interest ($P_{RoU}$) can also be derived from historic similar electric utility data for homes that match the user's data.

By way of additional example, a power associated with the house size or square footage may be represented as follows:

$P_{Sqft}$=P(Square Footage of House,Average use of Major Appliances,Updated Power Use from User Entered Appliances).

In addition, in certain embodiments, the power associated with the square footage ($P_{Sgh}$) can be specific user selected options and metrics inputted by the user.

In certain embodiments, an initial estimated home latch power (e.g., a time zero) may be represented as follows:

$I_{home\_est\_latch\_0} = (\gamma P_{Rou} + (1 + \gamma)P_{sqh})/V_{home}$, where $\gamma < 1$ (i.e., in which "$\gamma$" is a calibratable value that is less than one).

Also in certain embodiments, the initial conditions are averaged or blended together (step 310). Specifically, in certain embodiments, the power or current values of steps 306 (i.e., as obtained via the vehicle 100) and 308 (i.e., based on the characteristics of the home 102, e.g., based on default and/or static parameters) are blended and averaged together during step 310. In certain embodiments, the blending and averaging of these values may be represented as follows:

$I_{avg\_dis\_Latch\_0} = \beta * I_{home\_est\_latch\_0} + (1 - \beta) * I_{total\_Dis\_load\_0}$, where $\beta < 1$.

Also in certain embodiments, a moving average filter is applied to update the calculated values (step 312). Specifically, in various embodiments, a moving average "default" power value is updated and stored in computer memory for use in determining unplugged charge times for the RESS 114.

In certain embodiments, during step 312, the latched average current is updated for each discharge cycle based on a geographic location ["x"] (e.g., as obtained via a GPS and/or other location system) and used to estimate unplugged discharge times for the RESS 114. In various embodiments, this may be represented as follows:

$I_{avg\_dis\_Latch}[x, n] = \alpha I_{home\_est\_latch\_0}[x, n] + (1 - \alpha)I_{avg\_dis\_Latch}[x, n - 1].$ Also in various embodiments, the initial latched current updated values are also updated with a moving average during an active discharge time. In various embodiments, this may be represented as follows:

$I_{plug\_in}[n] = \alpha I_{avg\_dis\_Latch} + (1 - \alpha) \times I_{plug\_in}[n - 1]$, in which $\alpha < 1$ (i.e., in which "$\alpha$" is a calibratable value that is less than one).

Also in various embodiments, one or more time to discharge values are calculated (step 314). Specifically, in certain embodiments, the time to discharge may be calculated based on either a discharge level (DCL) or an out of energy level (OOE) for the RESS 114.

For example, in one embodiment using the discharge level (DCL), the time to charge may be represented as follows:

(Remaining Energy (*Whr*)−DCL Energy (*Whr*))/Latched Power (*W*) = Base Discharge Time (i.e., to the discharge level).

By way of additional example, in another embodiment using the out of energy level (OOE), the time to charge may be represented as follows:

(Remaining Energy (*Whr*)−OOE Energy (*Whr*))/Latched Power (*W*) = Base Discharge Time (i.e., to the discharge level).

In various embodiments, step 210 then terminates at 316.

With reference back to FIG. 2, in various embodiments, updated values are then determined using offboard information (step 212).

Figure 4:
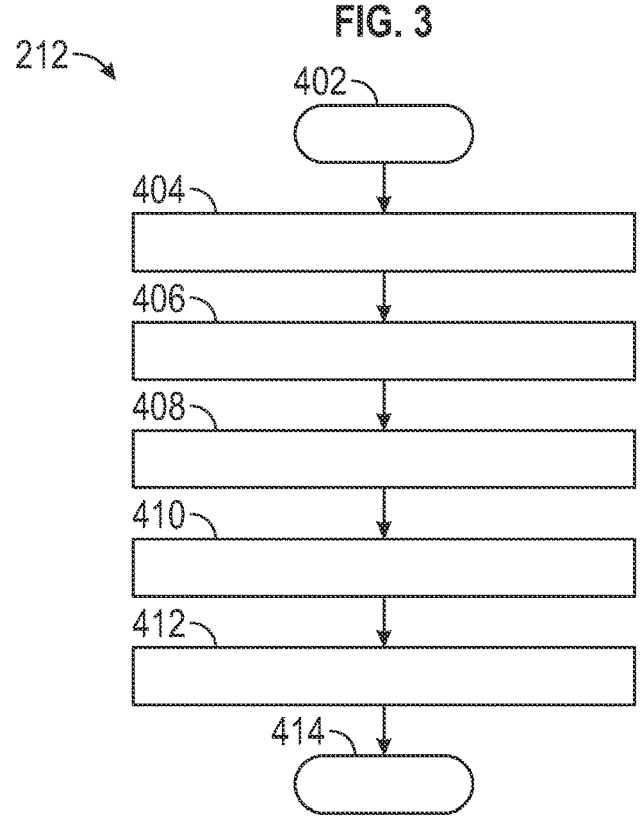

With reference to FIG. 4, a flowchart is provided for an exemplary implementation of step 212 of the process 200 of FIG. 2, in accordance with an exemplary embodiments. As depicted in FIG. 4, in various embodiments step 212 begins at step 402 (e.g., when offboard information is obtained after the initial determinations of step 210).

In various embodiments, average usage data is obtained (step 404). Specifically, in various embodiments, during step 404, data is obtained with respect actual power usage by the home 102. In various embodiments, the actual power usage is obtained from a recent time period (such as prior week, a prior month, or the like) as the present time period. In certain embodiments, the actual power usage is obtained from a prior year (e.g., from an immediately prior year) corresponding to the same time of year and/or season as the present time period. In various embodiments, average power usage for the home 102 are obtained and reported with respect to such prior time periods via information provided by the third party site 106 of FIG. 1 (e.g., an electric company that provides power to the home 102), and/or in certain embodiments from monitoring and/or record-keeping from the home 102 and/or the remote server 104. In certain embodiments, such average data may also be obtained as to other similar houses to the home 102 (e.g., in terms of geography, size, number of appliances, and so on).

Also in certain embodiments, meter data is obtained as to the actual power usage (step 406). Specifically, in certain embodiments, actual power readings are obtained from a power meter associated with the home 102 (e.g., via the sensors 158 and/or the power system 152), and/or as monitored via the remote server 104 and/or provided via the third party site 106. In certain embodiments, the meter data corresponds to an average power use of the home 102 for a present time period.

In addition, in certain embodiments, additional information is obtained as to a power outage (step 408). Specifically, in certain embodiments, a time of the outage is obtained (e.g., from the home 102 and/or the third party site 106) and recorded in computer memory, and a profile associated with the outage (e.g., as to the time of the outage, type of outage, and/or estimated duration thereof) is communicated (e.g., to the vehicle 100 via the remote server 104, in certain embodiments).

Also in various embodiments, a summation of power is performed (step 410). Specifically, in certain embodiments, the amount of power required during the power outage is summed or integrated until the time at which the power outage (e.g., power blackout) is deemed to be complete. In certain embodiments, summation of power may be represented as follows:

DCL_time_offboard =

(Remaining Energy $(Whr)$ − DCL Energy $(Whr)$)/Summed Power.

In various embodiments, this is performed so long as the following conditions are satisfied:

(Remaining Energy $(Whr)$ − DCL Energy $(Whr)$) −

(Summed Power ∗ Time_Increment) > 0.

Also in various embodiments, an updated time estimation is performed (step 412). Specifically, in various embodiments, the updated time estimation for the discharge time is updated based on a blending of the offboard power requirements for the home 102 (e.g., corresponding to steps 404-410) in combination with the previously-calculated power values associated with the vehicle 100 (e.g., including the charge of the RESS 114 and the parasitic load of the vehicle 100).

In various embodiments, step 212 then ends at step 414.

With reference back to FIG. 2, in various embodiments, machine learning updates are performed (step 214).

Figure 5:
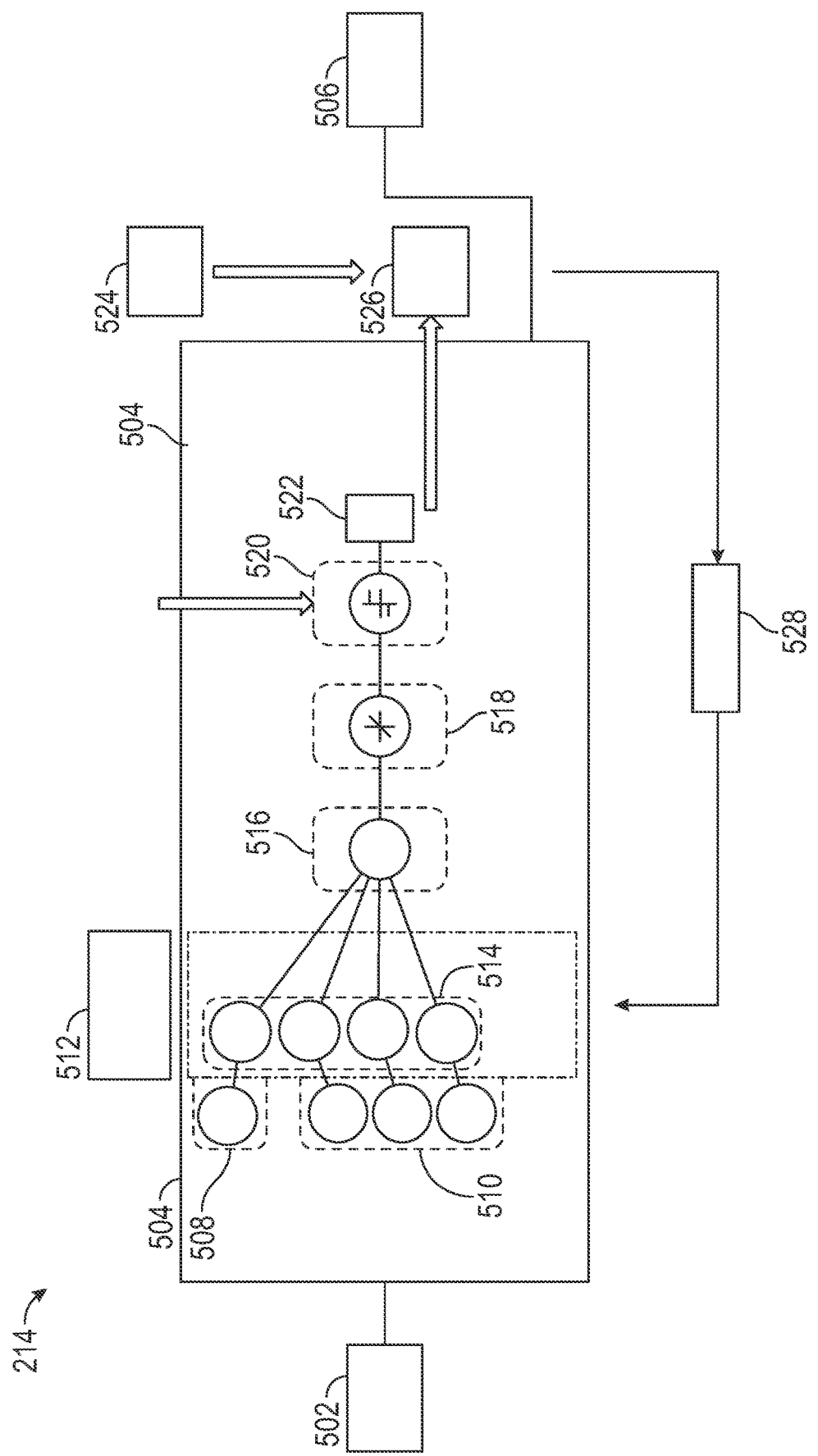

Turning now to FIG. 5, a flow diagram is provided for an exemplary implementation of step 214 of the process 200 of FIG. 2, in accordance with an exemplary embodiments.

As depicted in FIG. 5, in various embodiments input values are obtained (step 502). In various embodiments, the input values of step 502 include, among other possible values, the previously described home characteristics, such as the region of use, season of use, time of usage, square footage of the home 102, and the list of major appliances (and/or information as to usage thereof), along with the target discharge level and/or out of energy level, for example as described above. In certain embodiments the input values may initially be obtained via user inputs and/or from other sources (e.g., the remote server 104 and/or the third party site 106) in one or more initial iterations, and may be subsequently learned and/or stored in computer memory for subsequent iterations.

In various embodiments, the input values are provided to a machine learning algorithm (e.g., including a neural network model) in step 504. In various embodiments, output values are obtained at step 506, and include updated values for the time to discharge of the RESS 114 based on the machine learning.

In certain embodiments, the machine learning algorithm comprises a recursive least squares algorithm that learns continuously through error and prediction, using the inputs, to accurately predict the time to discharge. In certain embodiments, the machine learning algorithm utilizes a logarithmic minimization function.

Specifically, as depicted in FIG. 5, in various embodiments the machine learning algorithm utilizes a bias unit 508 in conjunction with input values 510 (i.e., from step 502) (e.g., $X_1$, $X_2$, . . . , $X_m$) in conjunction with an updating hypothesis 512 and weight coefficients 514 (e.g., $W_0$, $W_1$, $W_2$, . . . , $W_m$) in order to generate a net input function 516. Also in various embodiments, the net input function 516 is utilized to generate an activation function 518, which is then used in conjunction with a unit step function 520 to generate a predicted class label 522. In various embodiments, the predicted class label 522 is utilized along with truth data 524 to calculate an error 526 (e.g., Err-J(w)) and perform optimizing at 528 to find new weights (e.g., weighting coefficients 514) for the machine learning algorithm.

As alluded to above, eventually the machine learning algorithm yields the output values associated with step 506 in various embodiments. In addition, also in various embodiments, the output values include both (A) a predicted time to discharge level and (B) a predicted time to out of energy.

With reference back to FIG. 2, in various embodiments, usage based implementation is performed (step 216).

Figure 6:
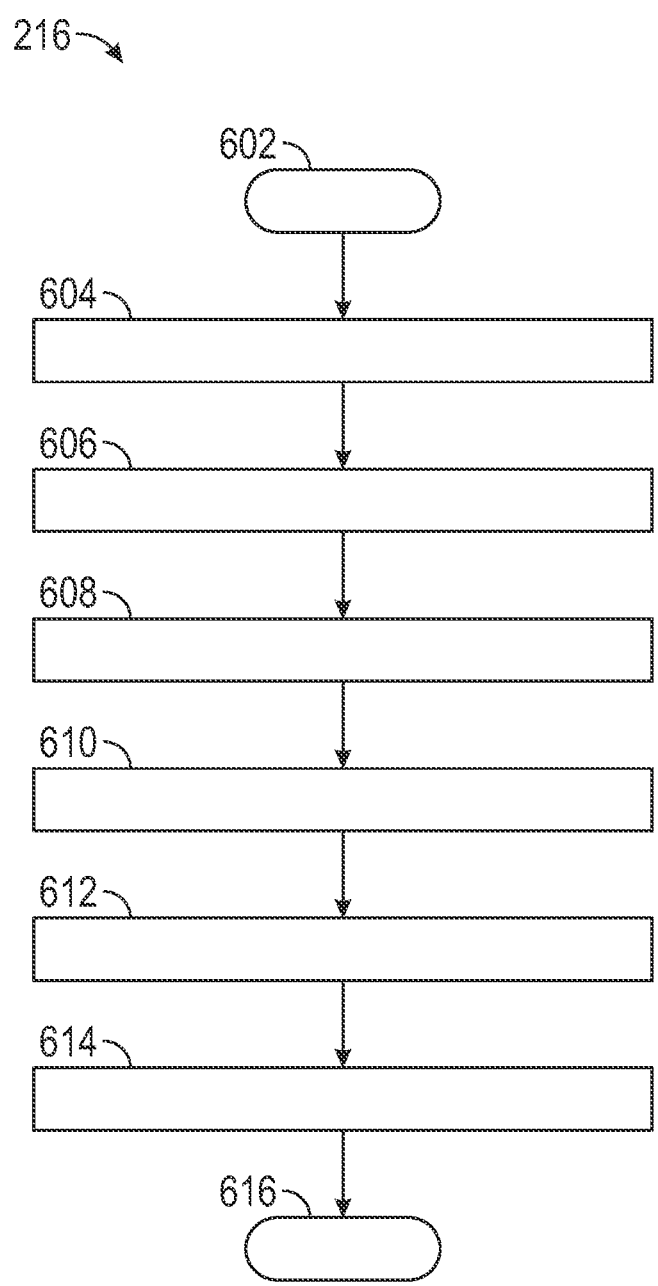

Turning now to FIG. 6, a flow diagram is provided for an exemplary implementation of step 216 of the process 200 of FIG. 2, in accordance with an exemplary embodiments.

As depicted in FIG. 6, in various embodiments step 216 begins at step 602, for example after the power outage has occurred.

In various embodiments, information as to the power outage is obtained (step 604). In various embodiments, the information includes, among other possible information, a time of the outage, a power usage prior to the outage (e.g., just seconds or minutes prior to the outage), a time to discharge level, a region of use, and profiles of one or more similar homes to the home 102.

In various embodiments, a high power consumption curve is generated (step 606). Specifically, in certain embodiments, a high power consumption curve is generated via one or more processors of FIG. 1 and/or from the third party site 106 of FIG. 1 (e.g., a utility company) based on energy usage profiles of high-power usage consumers (e.g., for consumers that utilize greater than average electric power for the houses, for example in comparison with other uses of other houses of similar size and characteristics). In various embodiments, the high power consumption curve is associated with a first group of users with power consumption that is greater than a predetermined threshold. In various embodiments, the high power consumption curve is obtained by an original equipment manufacturer (OEM) or one or more operator entities; however, this may vary in other embodiments.

In various embodiments, a low power consumption curve is generated (step 608). Specifically, in certain embodiments, a low power consumption curve is generated via one or more processors of FIG. 1 and/or from the third party site 106 of FIG. 1 (e.g., a utility company) based on energy usage profiles of low-power usage consumers (e.g., for consumers that utilize less than average electric power for the houses, for example in comparison with other uses of other houses of similar size and characteristics). In various embodiments, the low power consumption curve is associated with a second group of users with power consumption that is less than the predetermined threshold. In various embodiments, the low power consumption curve is obtained by an original equipment manufacturer (OEM) or one or more operator entities; however, this may vary in other embodiments.

Also in various embodiments, times to discharge are displayed (step 610). In various embodiments, a display is provided for a current user as to different potential times to discharge for the RESS 114 based on the different consumption curves of steps 606 and 608. Specifically, in various embodiments, one or more of the processors of FIG. 1 provide instructions for a display to be provided for a current user of the vehicle 100 as to different discharge times that can be obtained via the low power consumption curve versus the high power consumption curve (and, for example, with a calculated additional length of the discharge time than can be obtained from low power consumption as compared with high power consumption, and so on). In certain embodiments, the display is provided on a display of a mobile app of a smart phone or other electronic device of the user. In certain other embodiments, the display may also be provided on a display screen of the vehicle 100.

Also in various embodiments, smart appliance management is performed (step 612). In various embodiments, the smart appliance management is performed via one or more processors of FIG. 1 by automatically controlling a plurality of the appliances 154 in the home 102 by selectively switching one or more of the appliances 154 into an energy efficient mode, based on one or more comparisons of actual power consumption of the home with the low power consumption curve, the high power consumption curve, or both.

Specifically, in certain embodiments, when power consumption for the home 102 is near the high power consumption profile, the processor 160 of the control system 156 of the home 102 (e.g., as part of a home energy management system of the home 102) provides instructions for smart appliances (e.g., one or more of the appliances 154 of FIG. 1 that receive and act upon communications from the processor 160) switch into an energy efficiency mode (e.g., in which one or more lights are turned off or dimmed, a setting for an air conditioning or heating unit is adjusted to save energy or power, and so on). In addition, in certain embodiments, the user may provide manual commands for such energy efficiency modes after viewing the display of step 610, and so on.

In various embodiments, the reduced energy usage is reflected in updated calculations (step 614). In various embodiments, the reduced energy usage from the smart appliance management is reflected in updated power values and time to discharge values, including as reflected in the moving average filter. Specifically, in certain embodiments, the update may be represented as follows:

$$I_{avg\_dis\_Latch} = \alpha \sum\nolimits_{k=0}^{n} (1-a)^k I_{total\_Dis\_load}[n-k].$$

In various embodiments, step 216 then terminates at step 616.

With reference back to FIG. 2, in various embodiments one or more additional actions may also be performed (step 218). For example, in certain embodiments, one or more recommendations may also be provided to the user (e.g., in accordance with instructions provided by one or more of the processors of FIG. 1) for recommended actions from the user (e.g., for manually turning off and/or adjusting settings for one or more appliances 154 of the home 102), and so on.

In various embodiments, the process 200 then terminates at step 220.

Accordingly, methods, systems, and vehicles are provided for estimation and management of the time to discharge for the RESS of an electric vehicle that is used to provide back-up power to a home. In various embodiments, various characteristics of the home and current conditions pertaining thereto are utilized in calculating the time to discharge value. In addition, in various embodiments, the time to discharge is maintained, for example by switching smart appliances to low energy modes when appropriate based on calculations and determinations performed in accordance the system 10 and the process 200 as depicted in the Figures and as described above.

It will be appreciated that the systems, vehicles, and methods may vary from those depicted in the Figures and described herein. For example, the vehicle 100 of FIG. 1, and the various components thereof of FIG. 1 may vary in different embodiments. It will similarly be appreciated that the steps of the process 200 and implementations thereof may differ from those depicted in FIGS. 2-6, and/or that various steps of the process 200 may occur concurrently and/or in a different order than that depicted in FIGS. 2-6 and/or as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A method comprising:
obtaining sensor data for a vehicle having an energy storage system that is configured to provide power for a home under certain conditions, the sensor data for the vehicle comprising a parasitic load for the vehicle as the vehicle is plugged into the home;
obtaining home data as to a plurality of characteristics that pertain to power requirements for the home; and
calculating, via a processor, a discharge time for the energy storage system based on the sensor data for the vehicle and the plurality of characteristics of the home, and also based on the parasitic load and the plurality of characteristics of the home.

2. The method of claim 1, wherein:
the plurality of characteristics comprises a physical size of the home; and
the discharge time is calculated using the physical size of the home.

3. The method of claim 1, wherein:
the plurality of characteristics comprises a geographic location of the home; and
the discharge time is calculated using the geographic location of the home.

4. The method of claim 1, wherein:
the plurality of characteristics comprises a present time of year and a present time of day; and
the discharge time is calculated using the present time of year and the present time of day.

5. The method of claim 1, wherein:
the plurality of characteristics comprises a listing of appliances in the home; and
the discharge time is calculated using the listing of appliances in the home.

6. The method of claim 1, further comprising:
obtaining user inputs from a user of the home as to one or more of the plurality of characteristics; and
calculating, via the processor, an updated discharge time using the user inputs.

7. The method of claim 1, further comprising:
obtaining usage data as to actual usage of power of the home; and
calculating, via the processor, an updated discharge time using the usage data.

8. The method of claim 1, further comprising:
calculating, via the processor, an updated discharge time over time using the plurality of characteristics as inputs in a machine learning algorithm.

9. The method of claim 1, further comprising:
obtaining a high power consumption curve associated with a first group of users with power that is greater than a predetermined threshold;
obtaining a low power consumption curve associated with a second group of users with power consumption that is less than the predetermined threshold; and
automatically controlling a plurality of appliances in the home by selectively switching one or more of the plurality of appliances into an energy efficient mode, based on one or more comparisons of actual power consumption of the home with the low power consumption curve, the high power consumption curve, or both, in accordance with instructions provided by the processor.

10. A system comprising:
one or more sensors configured to obtain sensor data as to a vehicle having an energy storage system that is configured to provide power for a home under certain conditions, the sensor data for the vehicle comprising a parasitic load for the vehicle as the vehicle is plugged into the home; and
a processor that is coupled to the one or more sensors and that is configured to at least facilitate:
obtaining home data as to a plurality of characteristics that pertain to power requirements for the home; and
calculating a discharge time for the energy storage system based on the sensor data for the vehicle and the plurality of characteristics of the home, and also based on the parasitic load and the plurality of characteristics of the home.

11. The system of claim 10, wherein:
the plurality of characteristics comprises a physical size of the home; and
the processor is configured to at least facilitate calculating the discharge time using the physical size of the home.

12. The system of claim 10, wherein:
the plurality of characteristics comprises a geographic location of the home; and
the processor is configured to at least facilitate calculating the discharge time using the geographic location of the home.

13. The system of claim 10, wherein:
the plurality of characteristics comprises a present time of year and a present time of day; and
the processor is configured to at least facilitate calculating the discharge time using the present time of year and the present time of day.

14. The system of claim 10, wherein the processor is further configured to at least facilitate:
obtaining user inputs from a user of the home as to one or more of the plurality of characteristics; and
calculating an updated discharge time using the user inputs.

15. The system of claim 10, wherein the processor is further configured to at least facilitate:
obtaining usage data as to actual usage of power of the home; and
calculating an updated discharge time using the usage data.

16. The system of claim 10, wherein the processor is further configured to at least facilitate calculating an updated discharge time over time using the plurality of characteristics as inputs in a machine learning algorithm.

17. The system of claim 10, wherein the processor is further configured to at least facilitate:
obtaining a high power consumption curve associated with a first group of users with power that is greater than a predetermined threshold;
obtaining a low power consumption curve associated with a second group of users with power consumption that is less than the predetermined threshold; and
automatically controlling a plurality of appliances in the home by selectively switching one or more of the plurality of appliances into an energy efficient mode, based on one or more comparisons of actual power consumption of the home with the low power consumption curve, the high power consumption curve, or both.

18. A system comprising:
one or more sensors configured to obtain sensor data as to a high voltage storage device that is configured to provide power for a home under certain conditions; and
a processor that is coupled to the one or more sensors and that is configured to at least facilitate:
obtaining home data as to a plurality of characteristics that pertain to power requirements for the home, the plurality of characteristics including a physical size of the home, a geographic location in which the home is located, a present time of year, a present time of day, and a listing of appliances in the home; and calculating a discharge time for the energy storage system based on the sensor data for the high voltage storage device and the plurality of characteristics of the home, including the physical size of the home, the geographic location, the present time of year, the present time of day, and the listing of appliances in the home.

19. The system of claim 18, wherein the processor is further configured to at least facilitate:

obtaining a high power consumption curve associated with a first group of users with power that is greater than a predetermined threshold;

obtaining a low power consumption curve associated with a second group of users with power consumption that is less than the predetermined threshold; and automatically controlling a plurality of appliances in the home by selectively switching one or more of the plurality of appliances into an energy efficient mode, based on one or more comparisons of actual power consumption of the home with the low power consumption curve, the high power consumption curve, or both.

20. The system of claim 18, wherein the processor is further configured to at least facilitate calculating an updated discharge time over time using the plurality of characteristics as inputs in a machine learning algorithm.

* * * * *